(12) United States Patent
Liu et al.

(10) Patent No.: US 6,705,273 B1
(45) Date of Patent: Mar. 16, 2004

(54) COMBUSTION CHAMBER

(75) Inventors: Zhengbai Liu, Lisle, IL (US); Xinqun Gui, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/260,758

(22) Filed: Sep. 30, 2002

(51) Int. Cl.[7] ................................................ F02B 23/06
(52) U.S. Cl. ...................... 123/263; 123/276; 123/284
(58) Field of Search ................................. 123/263, 276, 123/282, 284, 279

(56) References Cited

U.S. PATENT DOCUMENTS

| | | | |
|---|---|---|---|
| 4,164,913 A | | 8/1979 | Komiyama et al. |
| 4,535,683 A | | 8/1985 | Dworak et al. |
| 4,617,887 A | * | 10/1986 | Nagase et al. ............. 123/279 |
| 4,721,080 A | | 1/1988 | Moriyasu et al. |
| 4,883,032 A | | 11/1989 | Hunter et al. |
| 4,953,528 A | * | 9/1990 | Oikawa et al. ............. 123/276 |
| 5,029,563 A | | 7/1991 | Hu |
| 5,099,809 A | * | 3/1992 | Kawatani et al. ........... 123/276 |
| 5,285,755 A | | 2/1994 | Regueiro |
| 5,560,334 A | * | 10/1996 | Daxer et al. ............... 123/279 |
| 5,653,204 A | | 8/1997 | Shaffer |
| 5,660,156 A | * | 8/1997 | Whitacre et al. ........... 123/279 |
| 5,809,962 A | | 9/1998 | Abbott et al. |
| 5,868,112 A | | 2/1999 | Mahakul et al. |
| 5,954,038 A | | 9/1999 | Warwick et al. |
| 6,112,715 A | | 9/2000 | Nigro et al. |

OTHER PUBLICATIONS

U.S. patent application Ser. No. 09/922,972, Liu, filed Aug. 6, 2001.
U.S. patent application Ser. No. 09/933,407, Liu et al., filed Aug. 20, 2001.
U.S. patent application Ser. No. 10/057,545, Liu et al., filed Jan. 23, 2002.
U.S. patent application Ser. No. 10/060,663, Liu et al., filed Jan. 30, 2002.
U.S. patent application Ser. No. 09/911,265, Liu et al., filed Jul. 23, 2001.

\* cited by examiner

Primary Examiner—Erick Solis
(74) Attorney, Agent, or Firm—Dennis Kelly Sullivan; Susan L. Lukasik; Jeffrey P. Calfa

(57) ABSTRACT

A combustion chamber assembly for use in a piston of a diesel engine includes a combustion chamber being defined in a crown of a piston, the combustion chamber having a center portion, the center portion being defined at least in part by a surface being a portion of a convex sphere to define a post, the sphere having a radius and an origin, the origin of the radius lying on a combustion chamber central axis and the combustion chamber further having an outwardly radially disposed sidewall margin, the sidewall margin being defined in part by an annular surface, the annular surface being concave and having an origin and a radius. The combustion chamber is further defined by an annular bowl lip surface. A piston and a method of forming a combustion chamber are further included.

53 Claims, 2 Drawing Sheets

COMBUSTION CHAMBER

TECHNICAL FIELD

The present invention relates to a piston designed for use in a compression ignition (diesel) internal combustion engine. More particularly, the present invention relates to a combustion chamber defined intersecting the crown of a piston.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation minimizing the NOx entrained in the engine exhaust and minimizing the amount of soot particulate also entrained in the engine exhaust. This should be accomplished without hurting the fuel economy of the engine and without adversely affecting the power output of the engine.

It is known that changes in any one of a variety of engine design/operating variables, such as engine compression, combustion chamber shape, fuel injection spray pattern, and other variables can have an effect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the NOx emissions from the engine. Ever increasing regulatory demands mandate reduced levels of NOx. Typically, a combustion chamber design that is effective at reducing NOx levels has been found to increase the levels of soot and vice-versa. Additionally, doing either of the aforementioned typically reduces engine torque and power outputs.

There are numerous examples of combustion chambers formed in the crown of piston. Notwithstanding all these prior art designs, there remains a need for reduction both in NOx and entrained soot while at the same time maintaining or enhancing engine torque and power outputs without adversely affecting the fuel economy of the engine.

SUMMARY OF THE INVENTION

The piston of the present invention substantially meets the aforementioned needs of the industry. The combustion chamber of the present invention defined intersecting the crown of the piston has been shown by substantiated simulation to both reduce soot entrainment and NOx emissions while at the same time slightly increasing engine power output. The piston has been shown to function effectively with cylinder heads having two or more valves. A further advantage of the piston of the present invention is that by being symmetrical with respect to a piston central axis, the combustion chamber is relatively easily formed in the crown of the piston. The piston and combustion chamber of the present invention are preferably used in heavy-duty and medium-duty diesel engines.

The present invention is a combustion chamber assembly for use in a piston of a diesel engine and includes a combustion chamber being defined intersecting a crown of a piston, the combustion chamber having a center portion, the center portion being defined at least in part by a surface being a portion of a convex sphere to define a post, the sphere having a radius and an origin, the origin of the radius lying on a combustion chamber central axis and the combustion chamber further having an outwardly radially disposed sidewall margin, the sidewall margin being defined in part by an annular surface, the annular surface being concave and having an origin and a radius. The combustion chamber is further defined by an annular bowl lip surface. The present invention is further a piston and a method of forming a combustion chamber.

DETAILED DESCRIPTION OF THE DRAWINGS

Figure 1:
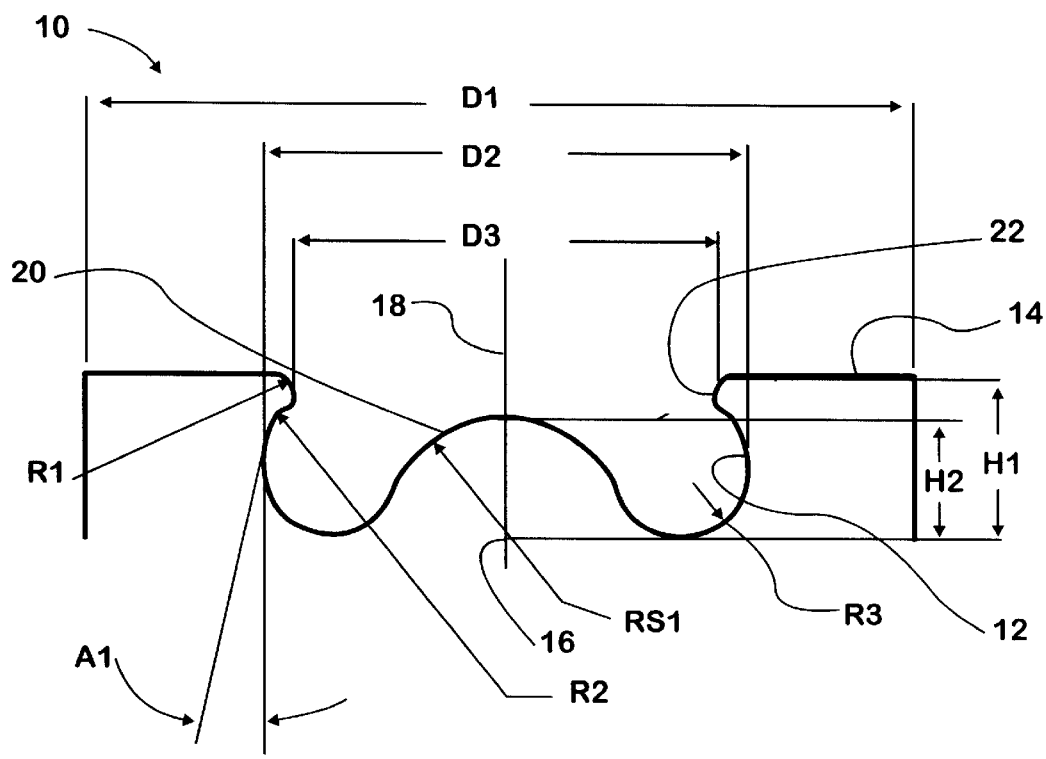
FIG. 1 is a sectional view of the piston and combustion chamber of the present invention.

The piston of the present invention is shown generally at 10 in FIG. 1. Generally, the piston 10 has a centrally located symmetrical upward-opening cavity bowl for forming a portion of a combustion chamber 12 within a cylinder of a diesel engine. The combustion chamber 12 is defined intersecting the crown 14 of the piston 10. The engine has a fuel injector (not shown) disposed generally above the piston 10 for forming a fuel injection plume relative to the combustion chamber 12. The piston 10 may be utilized with two-valve or multiple-valve heads. The piston 10 is effective for reducing diesel engine pollutant emissions, such as NOx and soot, as depicted in the graphic representations of FIGS. 3 and 4 and for providing a slight increase in power output, as noted in FIG. 2. The piston 10 is preferably applicable to heavy-duty and medium duty diesel engines.

The piston 10 has a symmetrical upwardly opening cavity or bowl for forming a major part of a combustion chamber 12 within a cylinder of a diesel engine. The combustion chamber (bowl) 12 can generally be described as having an annular bowl lip, a spherical bowl post, and an annular sidewall as described below.

The combustion chamber 12 is located intersecting the piston crown 14 of diesel engines and mainly comprises a portfolio of spherical surfaces, as shown in FIG. 1. A spherical surface, RS1, with an origin 16 preferably lying on the center chamber axis 18 forms the major part of the combustion chamber 12. The chamber axis 18 and the center axis of the piston 10 are co-axial. The spherical surface RS1 is located at the central bottom of the combustion chamber 12 to form a post 20 and has a radius of RS1.

An annular surface R3 forms the lower part of the sidewall of the combustion chamber 12 and has a radius of R3 and is smoothly joined to the post 20.

The combustion chamber 12 further has an annular bowl lip R1 with a radius of R1. The bowl lip R1 provides a smooth reentrant transition from the bowl defined in part by the annular surface R3 to the piston crown 14. The bowl lip R1 and the annular surface R3 are smoothly joined by a surface formed by rotating a curve R2, with a radius R2, and a line A1 through an angle A1 around the axis 18 of the combustion chamber 12. It should be noted that the combustion chamber 12 is free of straight surfaces and that all the surfaces defining the combustion chamber 12 are smoothly connected to minimize flow loss occurring in the combustion chamber 12.

As indicated In FIG. 1, D1 is the diameter of the piston 10, D2 is the diameter of the combustion chamber 12, D3 is the diameter of the bowl lip 22, H1 is the chamber bowl depth, H2 is the height of the bowl post 20 above a plane defined transverse to the axis 18 and tangent to the bottom of the annular surface R3.

The relationship of parameters that further controls the combustion chamber geometry and the combustion performance and emissions in diesel engines are listed below:

1. The ratio of D2/D1 is greater than 0.432 and is less than 0.832, and is preferably 0.576, D1 being the piston 10 diameter and D2 being the maximum diameter of the combustion 2. The ratio of D3/D1 is greater than 0.332 and is less than 0.812 and is preferably 0.505, D3 being the diameter of the bowl lip.

3. The ratio of RS1/D1 is greater than 0.092 and is less than 0.382, and is preferably 0.146.

4. The ratio of H1/D1 is greater than 0.082 and is less than 0.342 and is preferably 0.191, H1 being the depth of the combustion chamber bowl.

5. The ratio of H2/D1 is greater than 0.072 and is less than 0.482, and is preferably 0.146, H2 being the height of the post 20.

6. The ratio of R1/D2 is greater than 0.008 and less than 0.152, and is preferably 0.021.

7. The ratio of R2/D1 is greater than 0.011 and less than 0.256 and is preferably 0.021.

8. The ratio of R3/D1 is greater than 0.042 and less than 0.282 and is preferably 0.078.

9. The angle A1 of the line A1 is equal to or greater than zero and less than 45 degrees and is preferably 13.5 degrees.

The curved surfaces and smooth transitions of the combustion chamber 12 as previously described promote smooth flow in the combustion chamber 12 and act to reduce the thermal loading in the combustion chamber 12. Further, the combustion chamber 12 is preferably symmetrical about the chamber/piston axis 18. Accordingly, it is much easier to turn (form) the combustion chamber 12 in the crown 14 of the piston 10 as compared to an asymmetrical combustion chamber defined in a piston.

Figure 2:
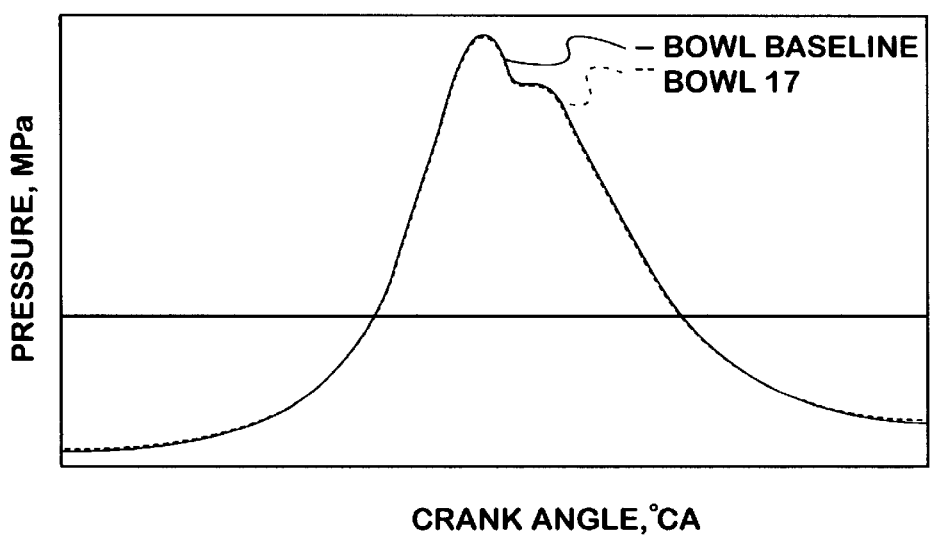
FIG. 2 is a graphic representation of power output of a baseline cylinder and a cylinder incorporating the combustion chamber of the present invention.

It should be noted in FIG. 2 that the simulations for prior art engine and the experimental results for the prior art engine are in substantial agreement (the empirical and simulation traces of the baseline being substantially coincident) as an indication of the validity of the simulation. It is noted that the trace of bowl 17 of the present invention has a slightly greater area under the curve than the baseline, area under the curves being representative of power output. The present invention, as indicated by bowl 17, has a slightly greater power output than the baseline combustion chamber.

Figure 3:
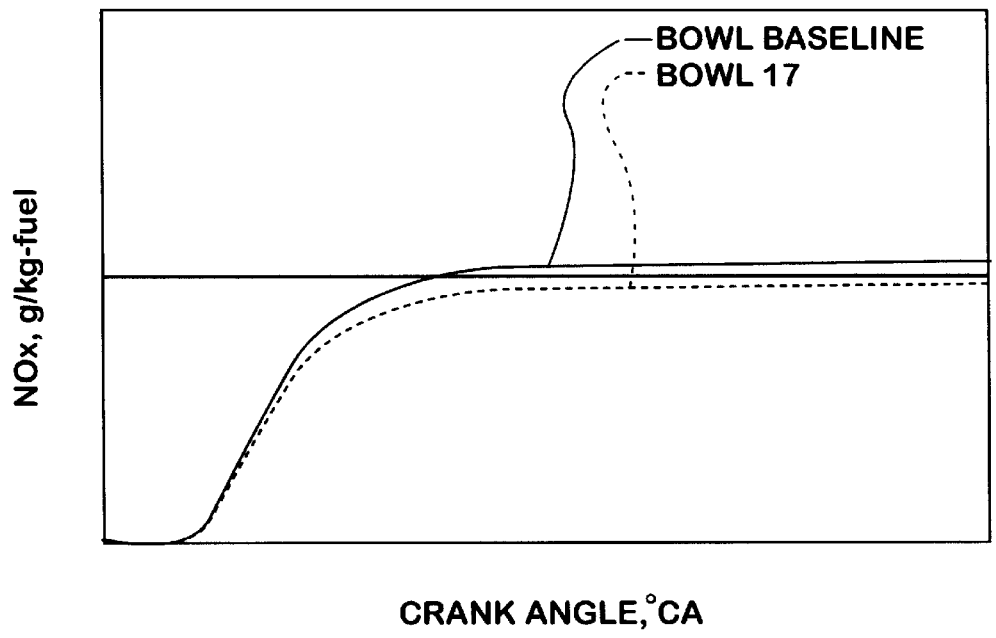
FIG. 3 is a graphic representation of empirical data of a prior art engine of NOx generated with respect to crank angle, noted as baseline, and a simulation of NOx generated by an engine with pistons and combustion chambers of the present invention, noted as bowl 17.
Figure 4:
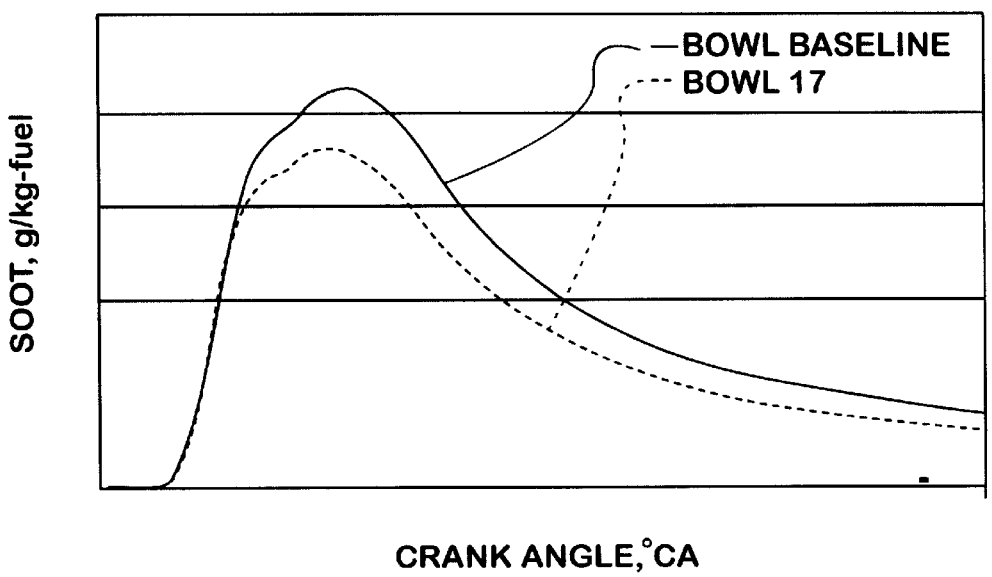
FIG. 4 is a graphic representation of the soot generated by the prior art baseline piston and combustion chamber as compared to the piston and combustion chamber of the present invention, noted as bowl 17.

Combustion performance improvement and pollutant emission reduction are depicted in FIG. 3 and 4. FIG. 3 depicts the NOx generation of a known combustion chamber as depicted by line baseline and the simulated results of NOx generation of the combustion chamber 12 of the present invention as depicted by line bowl 17. It is noted that the NOx generation by the combustion chamber 12 of the present invention is significantly less than the NOx of the known combustion chamber as depicted by line baseline.

FIG. 4 depicts the simulated soot generation of a known combustion chamber as depicted by line baseline in comparison with the simulated soot generation of the combustion chamber 12 of the present invention as depicted by line bowl 17. It should be noted that soot generation of the combustion chamber 12 (line bowl 17) is significantly less than the soot generation of the known combustion chamber (line baseline).

It will be obvious to those skilled in the art that other embodiments in addition to the ones described herein are indicated to be within the scope and breadth of the present application. Accordingly, the applicant intends to be limited only by the claims appended hereto.

What is claimed is:

1. A continuous, uninterrupted combustion chamber assembly for use in a piston of a diesel engine, comprising:

a combustion chamber being defined intersecting a crown of the piston, the combustion chamber having a center portion, the center portion being defined at least in part by a surface being a portion of a convex sphere to define a post, the sphere having a radius and an origin, the origin of the radius lying on a combustion chamber central axis;

the combustion chamber further having an outwardly radially disposed sidewall margin, the sidewall margin being defined at least in part by an annular surface, the annular surface being concave and having an origin and a radius; and the combustion chamber further being defined by an annular bowl lip surface joined to the sidewall margin.

2. The combustion chamber assembly of claim 1 having smooth transitions between adjacent surfaces.

3. The combustion chamber assembly of claim 1 wherein the origin of the post is disposed on the center axis of the combustion chamber coaxial with the center axis of the piston.

4. The combustion chamber assembly of claim 1 wherein the sidewall portion of the combustion chamber is substantially defined by a second annular surface.

5. The combustion chamber assembly of claim 1 where the annular surface substantially defining the sidewall portion of the combustion chamber is transitioned to a piston crown by the bowl lip surface, the bowl lip surface being connected to a surface formed by rotating a second surface and a line with a known angle around a combustion chamber center axis.

6. The combustion chamber assembly of claim 1 wherein the ration of the radius of the center portion convex spherical surface, RS1, of the combustion chamber to the piston diameter, D1, is greater than 0.092 and less than 0.382.

7. The combustion chamber assembly of claim 6 wherein the ratio of the radius of the center portion convex spherical surface, RS1, of the combustion chamber to the piston diameter, D1, is substantially 0.146.

8. The combustion chamber assembly of claim 1 wherein the ratio of the combustion chamber bowl diameter D2 to the piston diameter D1 is greater than 0.432 and less than 0.832.

9. The combustion chamber assembly of claim 8 wherein the ratio of the combustion chamber bowl diameter D2 to the piston diameter D1 is substantially 0.576.

10. The combustion chamber assembly of claim 1 wherein the ratio of the diameter of the bowl lip D3 to the piston diameter D1 is greater than 0.332 and less than 0.812.

11. The combustion chamber assembly of claim 10 wherein the ratio of the diameter of the bowl lip D3 to the piston diameter D1 is substantially 0.505.

12. The combustion chamber assembly of claim 1 wherein the ratio of the annular surface R1 to the diameter of the bowl D2 is between 0.008 and 0.152.

13. The combustion chamber assembly of claim 1 wherein the ratio of the annular surface R2 to the diameter of the piston D1 is between 0.011 and 0.256.

14. The combustion chamber assembly of claim 1 wherein the ratio of the annular surface R3 to the diameter of the piston D1 is between 0.042 and 0.282.

15. The combustion chamber assembly of claim 1 wherein the angle A1 is equal to or greater than zero and less than 45 degrees.

16. The combustion chamber assembly of claim 15 wherein the angle A1 is substantially 13.5 degrees.

17. The combustion chamber assembly of claim 1 wherein the ratio of the bowl depth H1 to the diameter of the piston D1 is greater than 0.082 and less than 0.342.

18. The combustion chamber assembly of claim 1 wherein the ratio of the bowl post height H2 to the maximum diameter D1 of the piston is greater than 0.072 and less than 0.482.

19. The combustion chamber assembly of claim 18 wherein the ratio of the height H2 to the diameter D1 of the piston is substantially 0.146.

20. The combustion chamber assembly of claim 17 wherein the ratio of the bowl depth H1 to the diameter D1 is substantially 0.191.

21. The combustion chamber assembly of claim 1 the combustion chamber having a central axis, the combustion chamber central axis being coincident with a piston central axis.

22. The combustion chamber assembly of claim 1 being formed free of flat surfaces.

23. A piston for use in a diesel engine, the piston having a central axis, comprising:
  a continuous, uninterrupted combustion chamber being defined intersecting a crown of the piston, the combustion chamber having a center portion, the center portion being defined at least in part by a surface being a portion of a convex sphere to define a post, the sphere having a radius and an origin, the origin of the radius lying on a combustion chamber central axis; and
  the combustion chamber further having an outwardly radially disposed sidewall margin, the sidewall margin being defined at least in part by an annular surface, the annular surface being concave and having an origin and a radius; and
  the combustion chamber further being defined by an annular bowl lip surface joined to the sidewall margin.

24. The combustion chamber assembly of claim 23 having smooth transitions between adjacent surfaces.

25. The combustion chamber assembly of claim 23 wherein the origin of the post is disposed on the center axis of the combustion chamber coaxial with the center axis of the piston.

26. The combustion chamber assembly of claim 23 wherein the sidewall margin of the combustion chamber is substantially defined by a second annular surface.

27. The combustion chamber assembly of claim 23 where the annular surface substantially defining the sidewall portion of the combustion chamber is transitioned to a piston crown by the bowl lip surface, the bowl lip surface being connected to a surface formed by rotating a second annular surface and a line with a known angle around a combustion chamber center axis.

28. The combustion chamber assembly of claim 23 wherein the ratio of the radius of the center portion convex spherical surface, RS1, of the combustion chamber to the piston diameter, D1, is greater than 0.092 and less than 0.382.

29. The combustion chamber assembly of claim 23 wherein the ratio of the radius of the center portion convex spherical surface, RS1, of the combustion chamber to the piston diameter, D1, is substantially 0.146.

30. The combustion chamber assembly of claim 23 wherein the ratio of the combustion chamber bowl diameter D2 to the piston diameter D1 is greater than 0.432 and less than 0.832.

31. The combustion chamber assembly of claim 30 wherein the ratio of the combustion chamber bowl diameter D2 to the piston diameter D1 is substantially 0.576.

32. The combustion chamber assembly of claim 23 wherein the ratio of the diameter of the bowl lip D3 to the piston diameter D1 is greater than 0.332 and less than 0.812.

33. The combustion chamber assembly of claim 32 wherein the ratio of the diameter of the bowl lip D3 to the piston diameter D1 is substantially 0.505.

34. The combustion chamber assembly of claim 23 wherein the ratio of the annular surface R1 to the diameter of the bowl D2 is between 0.008 and 0.152.

35. The combustion chamber assembly of claim 23 wherein the ratio of the annular surface R2 to the diameter of the piston D1 is between 0.011 and 0.256.

36. The combustion chamber assembly of claim 23 wherein the ratio of the annular surface R3 to the diameter of the piston D1 is between 0.042 and 0.282.

37. The combustion chamber assembly of claim 36 wherein the angle A1 is equal to or greater than zero and less than 45 degrees.

38. The combustion chamber assembly of claim 37 wherein the angle A1 is substantially 13.5 degrees.

39. The combustion chamber assembly of claim 23 wherein the ratio of the bowl depth H1 to the diameter of the piston D1 is greater than 0.082 and less than 0.342.

40. The combustion chamber assembly of claim 23 wherein the ratio of the bowl post height H2 to the maximum diameter D1 of the piston is greater than 0.072 and less than 0.482.

41. The combustion chamber assembly of claim 40 wherein the ratio of the height H2 to the diameter D1 of the piston is substantially 0.146.

42. The combustion chamber assembly of claim 39 wherein the ratio of the bowl depth H1 to the diameter D1 is substantially 0.191.

43. The combustion chamber assembly of claim 23 the combustion chamber having a central axis, the combustion chamber central axis being coincident with a piston central axis.

44. The combustion chamber assembly of claim 23 being formed free of flat surfaces.

45. A method of forming a combustion chamber for use in a piston of a diesel engine, comprising:
  defining a continuous, uninterrupted combustion chamber bowl intersecting a crown of the piston, the piston having a central axis, the combustion chamber being formed by:
    defining a combustion chamber elevated center post at least in part by a portion of a convex sphere, the sphere having a radius and an origin,
    defining a combustion chamber sidewall margin in part by a concave annular surface, the concave annular surface having a radius and being joined to the post; and defining an annular bowl lip, the bowl lip providing a smooth reentrant transition to the crown of the piston and being joined to the sidewall margin.

46. The method of claim 45 including defining a plurality of combustion chamber spherical and annular surfaces having smooth transitions between adjacent curved surfaces, the curved surfaces including at least the convex spherical center post, the concave annular sidewall margin surface, and the bowl lip.

47. The method of claim 45 including defining the combustion chamber by a spherical surface and a plurality of annular surfaces.

48. The method of claim 45 including disposing the origin of the convex spherical center post on the piston central axis.

49. The method of claim 45 including forming the combustion chamber free of flat surfaces.

50. The method of claim 45 including disposing a combustion chamber central axis coincident with the piston central axis.

51. The method of claim 45 including defining the bowl lip by rotating a second annular surface and a line with a known angle around the combustion chamber center axis.

52. The method of claim 51 including setting the known angle at zero or between zero degrees and forty-five degrees relative to a chamber center axis.

53. The method of claim 51 including setting the known angle at substantially 13.5 degrees relative to a chamber center axis.

* * * * *